March 13, 1956  J. A. ORR  2,737,746
HANDLE WITH FLORAL PIECES
Filed June 30, 1952  2 Sheets-Sheet 1
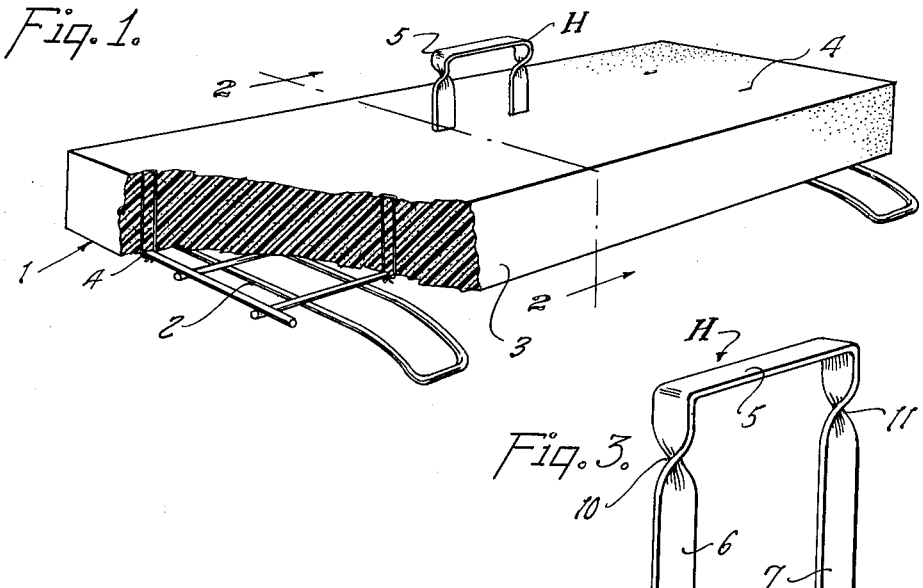
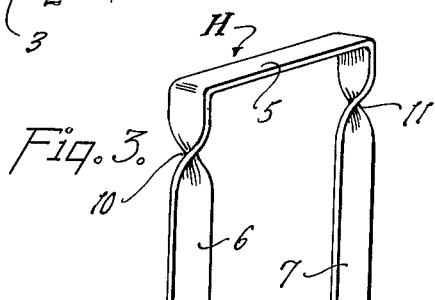
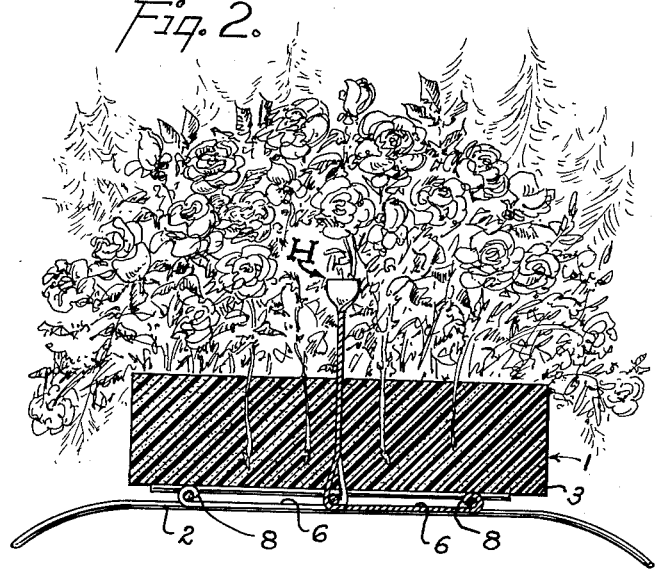
INVENTOR.
Jack A. Orr
BY
Wayland D. Keith
HIS AGENT March 13, 1956  J. A. ORR  2,737,746
HANDLE WITH FLORAL PIECES
Filed June 30, 1952  2 Sheets-Sheet 2
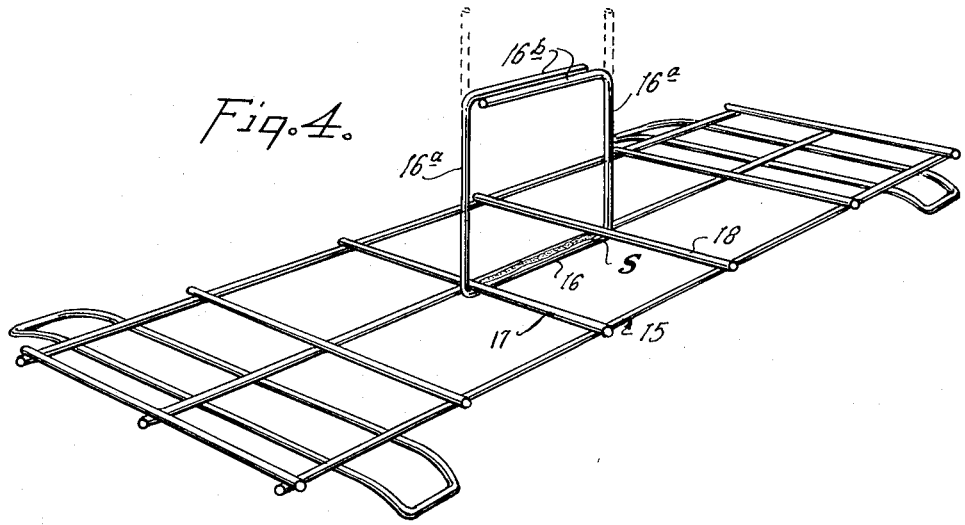
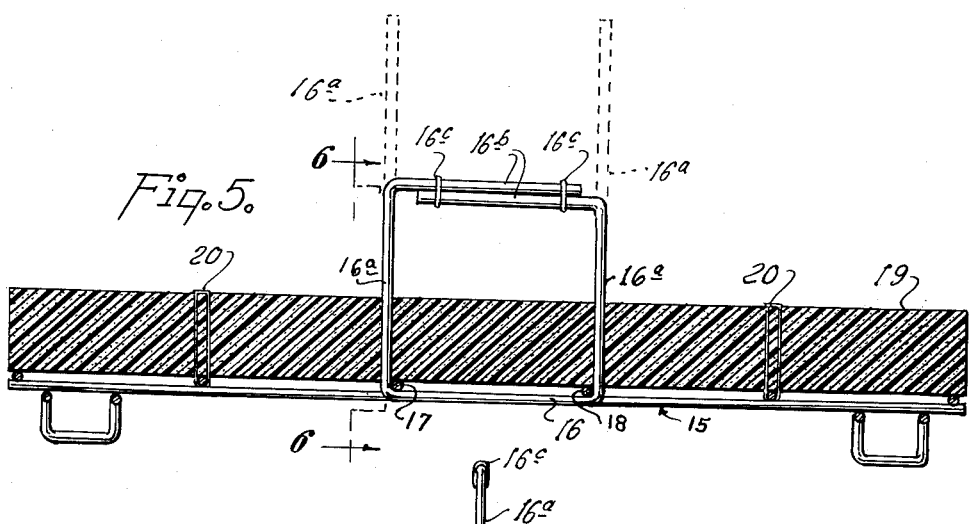
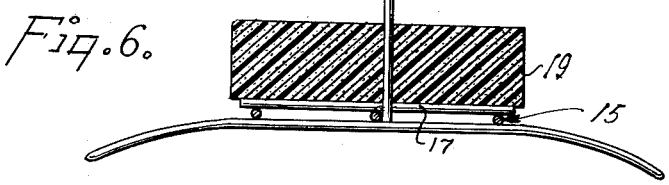
INVENTOR.
Jack A. Orr
BY
Wayland D. Keith
HIS AGENT

United States Patent Office 2,737,746
Patented Mar. 13, 1956

2,737,746
HANDLE WITH FLORAL PIECES
Jack A. Orr, Quanah, Tex.

Application June 30, 1952, Serial No. 296,280

2 Claims. (Cl. 41—12)

This invention relates to handles for floral pieces, and more particularly to handles for sprays and other decorative floral arrangements that require handling after they are made up.

Heretofore such floral arrangements had to be handled from the bottom or back, which required much time, and, if the pieces were large, the task was laborious, and likely to result in damage to the flowers or to the hands of the person handling the pieces.

The present invention expedites the handling of floral pieces when they must be moved and rearranged quickly. The present handle can be made so that it can be readily attached to the frame on which the floral piece is built, and yet to be so inconspicuous that the decorative effect of the floral piece is not marred, yet the handle is readily available for quick, efficient handling of the piece.

An object of this invention is to provide a handle for a floral piece whereby the piece may be handled easily and without damage to the flowers or to the arrangement thereof.

Another object of the invention is to provide a handle for a floral piece which may be readily attached to the frame on which the piece is formed in such manner as to preclude the likelihood of the handle giving way when the piece is being handled.

Yet another object of the invention is to provide a handle for a floral piece that is easy and inexpensive to make and which is efficient and inconspicuous to use.

An embodiment of this invention, together with a modification thereof, are illustrated in the accompanying drawings in which like reference characters designate like parts in the several views thereof, in which:

Fig. 1 is a perspective view of the base or foundation of a floral piece, showing the handle in place thereon, with parts broken away and shown in section to bring out the details of construction;

Fig. 2 is a cross-sectional view taken on the line 2—2 of Fig. 1, looking in the direction indicated by the arrows, and showing flowers arranged on the foundation;

Fig. 3 is a perspective view of the handle as shown in Fig. 1, but apart from the floral piece;

Fig. 4 is a perspective view of a different type of base for a floral piece, showing the handle secured longitudinally thereof, and as formed of the same material as the base or frame work of the floral piece;

Fig. 5 is a longitudinal cross-sectional view of the base and handle as shown in Fig. 6; and Fig. 6 is a transverse cross-sectional view taken on the line 6—6 of Fig. 5, showing the handle as attached to the base.

For purposes of illustration, the floral arrangement will be described as a casket piece, but it is to be understood that the applicant is not limiting himself to that use. The invention will be used a great deal for funeral pieces, particularly because they require considerable handling, but it will be found applicable to a great variety of floral pieces, regardless of the occasion of use.

With more detailed reference to the drawing, the handle as shown in Figs. 1 through 3, is designated generally by the letter H. The numeral 1 generally designates the base or foundation of a floral piece, which base comprises a framework 2, that may be made of wire, or other suitable material, and of a shape dictated by the use to which the floral piece is to be put. A cellular, foam plastic mounting block 3 substantially covers the framework 2 and is secured thereto by wires 4, or other suitable means.

The handle H may be constructed of a strip of metal and comprises a hand portion 5 and depending leg members 6 and 7, each leg being bifurcated for a portion of the length thereof, as shown at 8—8 and 9—9 respectively, and the extremity of each bifurcated portion is pointed to facilitate the placing of the leg through the block 3.

The respective leg members are twisted a quarter turn, as shown at 10 and 11, to enable the legs to be spread transversely of the cellular block 3, after they have been pushed therethrough from the top. The bifurcated portions of the legs are then spread and intertwined with the frame member 2, as shown in Fig. 2, in such manner as to securely fasten the handle to the frame. If it is desired the handle ends may extend to the outside of the frame and be fastened about the exterior members of the frame, if the size and weight of the piece require that the handle be of maximum strength.

It is to be understood that the handle may be colored to correspond to the flowers or the foliage, or it may be wrapped with decorative material, or the flowers may be so arranged as to make the handle unobvious to the casual observer, but which handle is readily available for handling the floral piece.

The modified form of the invention, as shown in Figs. 4 through 6, shows a little different manner of accomplishing the same result, by providing a handle for a floral piece to facilitate the handling thereof, which handle is so securely fastened to the base of the floral piece, that it will not pull out, even though the piece is large and heavy.

In this form of the invention, the frame-work, which may be of wire or metal strips, is designated by the numeral 15. An auxiliary wire or strip 16 extends beneath transverse members 17 and 18 of the frame-work. The ends 16a of the member 16 are up-turned substantially at right angles to the frame-work, and which up-turned portions 16a extend upward through plastic foam block 19. The plastic foam block 19 corresponds to the block 3 of the form of the invention previously described, and substantially covers the frame-work 15 and is secured thereto by means of wires or clips 20.

The auxiliary member 16 may be welded or soldered to the frame, as shown at S, whereupon, the upstanding leg portions 16a, as indicated in Fig. 5, will present parallel legs, which enables the solidified cellular foam plastic block to be pressed downward thereover. When the block is in proper position, and is secured to the framework, the portions 16a of the leg members are bent to form a handle 16b, as indicated in full outline in Figs. 4 and 5. The members 16a are secured together in overlapping relation to form the handle 16b, which overlapping portions may be secured together by wrapping one about the other, by means of wires or clips 16c, or in other suitable manner that will hold the members firmly together to form a handle of sufficient strength to enable the efficient handling of the floral piece.

The two forms of the invention serve the same purpose, the only difference being that the result is accomplished in a slightly different manner.

The form of the invention, as shown in Figs. 1 through 3, is more readily adaptable for use on a floral piece, the foundation of which and perhaps even the floral arrangement of which has already been made up.

The form of the invention as shown in Figs. 4 through 6, more readily lends itself to being made up with and as the foundation for the floral piece is made up. Both forms of handle may be decorated to become a component of the floral motif.

It is to be understood that changes may be made in the details of construction of the device as described and claimed, without departing from the spirit of the invention as claimed.

Having thus described the invention, what is claimed is:

1. In combination, a base and a handle for a floral piece, the base of which floral piece comprises a frame member and a plastic foam mounting block secured together, said handle comprising a strip of formable metal with a transverse, hand grip portion and down-turned leg portions, said transverse, hand grip portion being positioned to extend above said plastic foam mounting block, each of said down-turned leg portions being bifurcated from the terminal end thereof for a portion of the length, each bifurcated portion of each leg being pointed at the extremity, said bifurcated legs being passed through said plastic foam mounting block and said frame, the bifurcated ends of said respective leg portions being bent to conform transversely with the underside of said frame so as to secure said handle to said frame.

2. The device substantially as set forth in claim 1, wherein—said leg portions are twisted near the transverse, hand grip portion of said handle, so when said leg portions are passed through said mounting block and said frame said leg portions will be at right angles to said transverse, hand grip portion.

References Cited in the file of this patent

UNITED STATES PATENTS

| | | |
|---|---|---|
| D. 110,260 | Robinson | June 28, 1938 |
| 771,509 | Temblett | Oct. 4, 1904 |
| 1,180,941 | Phelps | Apr. 25, 1916 |
| 2,075,006 | Braun | Mar. 30, 1937 |
| 2,261,326 | Atkisson | Nov. 4, 1941 |
| 2,618,901 | Braun | Nov. 25, 1952 |

FOREIGN PATENTS

| | | |
|---|---|---|
| 14,785 | Great Britain | June 24, 1909 |